United States Patent [19]

Deubzer et al.

[11] 4,102,970

[45] Jul. 25, 1978

[54] THERMOSETTING COMPOSITIONS WHICH CAN BE CURED TO FORM MOLDED OBJECTS OR COATINGS

[75] Inventors: Bernward Deubzer; Werner Graf, both of Burghausen, Germany

[73] Assignee: Wacker-Chemie GmbH, Munich, Germany

[21] Appl. No.: 780,576

[22] Filed: Mar. 23, 1977

Related U.S. Application Data

[63] Continuation of Ser. No. 607,724, Aug. 25, 1975, abandoned.

[51] Int. Cl.² .............................................. B28B 3/20
[52] U.S. Cl. ................................ 264/176 R; 260/18 S; 260/29.1 SB; 260/37 SB; 260/825; 264/331; 528/33; 528/34
[58] Field of Search ................... 260/29.1 SB, 37 SB, 260/18 SB, 46.5 R, 825, 46.5 G; 264/176 R, 331

[56] References Cited

U.S. PATENT DOCUMENTS

| | | | |
|---|---|---|---|
| 3,002,946 | 10/1961 | Thomas | 260/29.1 SB |
| 3,839,280 | 10/1974 | Zdaniewski | 260/46.5 R |
| 3,862,065 | 1/1975 | Yokokawa et al. | 260/18 S |

*Primary Examiner*—Melvyn I. Marquis

[57] ABSTRACT

Thermosetting compositions which can be used to form molded articles and coatings comprising (1) organopolysiloxanes having at least 40 mol percent monoorganosiloxane units and at least 0.1 percent by weight of condensable groups, (2) fillers and/or reinforcing agents, (3) a condensation catalyst, if desired, and (4) diorganopolysiloxanes having a viscosity of at least 30 cSt at 25° C. in which the diorganopolysiloxanes (4) are present in an amount of from about 15 to 30 percent by weight based on the organopolysiloxanes (1), and the mixture of organopolysiloxanes (1) and (4) forms two phases.

9 Claims, No Drawings

THERMOSETTING COMPOSITIONS WHICH CAN BE CURED TO FORM MOLDED OBJECTS OR COATINGS

This is a continuation, of application Ser. No. 607,724, filed Aug. 25, 1975, and now abandoned.

This invention relates to thermosetting compositions, particularly to heat curable compositions which can be molded into articles or coatings that are substantially free of shrinkage on curing.

Organopolysiloxane based compositions containing at least 40 mol percent of monoorganosiloxane units and at least 0.1 percent by weight of condensable groups, fillers and/or reinforcing agents as well as condensation catalysts which can be molded into articles or coatings under the influence of heat, are well known in the art. (See, for example, W. Noll "Chemie und Technologie der Silicone" second edition, Weinheim 1968, pages 352 through 366, as well as French Pat. Nos. 2,025,721 and 2,044,817 to General Electric Company and Wacker-Chemie GmbH, respectively.) Also, heat curable compositions which are used to form molded articles and coatings and contain block copolymers as the organopolysiloxanes are disclosed in French Pat. No. 1,489,996 to Dow Corning Corporation. Compared to the aforementioned compositions, the compositions of this invention offer several advantages. For example, they not only result in the production of molded articles and coatings having excellent heat resistance and outstanding electrical properties, but are substantially free of or at least exhibit a substantial reduction in shrinkage in volume between molding and termination of the curing step. The avoidance of or at least a substantial reduction in the degree of shrinkage avoids the formation of tension areas and fissures in the molded articles or coatings and permits the manufacture of molded articles and coatings having exact predetermined dimensions. Surprisingly, these advantages are achieved without any observable bleeding or exudation of the relatively large quantity of diorganopolysiloxanes employed. Moreover, the compositions of this invention are easier to obtain than prior compositions which have been used in molding articles.

Therefore, it is an object of this invention to provide thermosetting compositions which are substantially free of shrinkage when molded into articles and cured. Another object of this invention is to provide compositions which are substantially free of tension areas and fissures when molded into articles or coatings. Still another object of this invention is to provide heat curable compositions which can be molded and cured to form articles of exact predetermined dimensions. A further object of this invention is to provide heat curable compositions having excellent heat resistance and electrical properties, but are free of bleeding or exudation.

The foregoing objects and others which will become apparent from the following description are accomplished in accordance with this invention, generally speaking, by providing thermosetting compositions which contain (1) organopolysiloxanes having at least 40 mol percent of monoorganosiloxane units and at least 0.1 percent by weight of condensable groups, (2) fillers and/or reinforcing agents and (3) condensation catalysts, if desired, and (4) diorganopolysiloxanes in an amount of from about 15 to 30 percent weight based on the weight of the organopolysiloxanes (1) and having a viscosity of at least 30 cSt at 25° C. in which the mixture of organopolysiloxanes (1) and (4) forms two phases.

The compositions of this invention are especially suited for preparing molded articles and coatings since they are substantially free of shrinkage between the molding step and vulcanization. This improvement is due primarily to the addition of from 15 to 30 percent by weight based on the weight of the organopolysiloxanes (1) of diorganopolysiloxanes (4) having a viscosity of at least 30 cSt at 25° C., in which organopolysiloxanes (4) are incompatible with organopolysiloxanes (1) and thus forms two phases.

The organopolysiloxanes (1) employed in accordance with this invention can be the same as those used heretofore in the preparation of molded articles or coatings from heat curable compositions based on organopolysiloxanes, fillers and/or reinforcing agents and condensation catalysts, when necessary. However, these organopolysiloxanes must contain at least 40 mol percent monoorganosiloxane units and also contain at least 0.1 percent by weight of condensable groups. It is preferred that these organopolysiloxanes be of the type which contain at least 40 mol percent of units of the formula $RSiO_{3/2}$ and units of the formula $R_2SiO$, $R_3SiO_{1/2}$ and/or $SiO_{4/2}$ as residual units in which R represents a substituted or unsubstituted monovalent hydrocarbon radical having from 1 to 12 carbon atoms. Moreover, it is preferred that the $R_2SiO$ units in these organopolysiloxanes not exceed about 55 mol percent and that the units of the formula $R_3SiO_{1/2}$ and $SiO_{4/2}$ not exceed about 10 mol percent, respectively, and more preferably not more than about 5 mol percent. In addition, up to about 5 percent of the R radicals can be substituted by hydrogen. Silicon bonded hydrogen atoms can, however, present difficulties during the storage of these compounds. Thus, it is preferred that the compositions of this invention be substantially free of Si-bonded hydrogen atoms.

Examples of hydrocarbon radicals represented by R are alkyl radicals such as methyl, ethyl, n-propyl, isopropyl, n-butyl and sec.-butyl radicals as well as octyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radicals such as the tolyl radical; and aralkyl radicals such as the benzyl radical. Examples of substituted hydrocarbon radicals represented by R are the halogenated monovalent hydrocarbon radicals such as the 1,1,1-trifluoropropyl and the alpha, alpha, alpha-trifluorotolyl radical as well as chlorophenyl and dichlorophenyl radicals. However, because they are more readily available, it is preferred that at least 85 percent of the R radicals be methyl or phenyl radicals and that at least 50 percent of the R radicals be methyl radicals.

Examples of condensable groups, i.e., groups which substitute a hydrogen atom or an alkyl group for a portion of the siloxane units in the above formulas are hydroxyl groups and SiOC-bonded alkyl radicals having from 1 to 8 carbon atoms such as the previously mentioned alkyl radicals.

The preferred organopolysiloxanes (1) are those containing an average of 0.3 to 1.2 phenyl radicals per Si atom with an overall average of 0.9 to 1.7 SiC-bonded organic radicals per Si atom and containing at least 0.1 percent by weight of Si-bonded hydroxyl groups as well as possibly up to 3 percent by weight of SiOC-bonded alkyl radicals. Such organopolysiloxanes are generally known. Additional examples of organopolysiloxanes (1) are hydrolysates of methyl trichlorosilane containing 0.1 percent by weight of Si-bonded hydroxyl groups as well as possibly up to 3 percent of SiOC-bonded alkyl groups or mixtures containing up to 5 percent of dimethyldichlorosilane or methyltrimethoxysilane, and up to 5 mol percent of dimethyldiethoxysilane. In a preferred embodiment the organopolysiloxanes (1) are solid at room temperature and consist of a powder before they are mixed with the organopolysiloxanes (4).

According to another preferred embodiment of this invention the organopolysiloxanes (1) can, however, also be prepared by hydrolyzing hydrolyzable monoorganosilanes or mixtures of hydrolyzable silanes which contain at least 40 mol percent of hydrolyzable monoorganosilanes in the presence of the diorganopolysiloxanes which have been employed as component (4) when the diorganopolysiloxanes have a viscosity of at least 200 cSt at 25° C. At room temperature the thus obtained mixtures are tough viscous or solid compounds. Examples of hydrolyzable silanes in addition to those previously mentioned are phenyltrichlorosilane, methylphenyldichlorosilane and diphenyldichlorosilane.

The fillers (2) employed in accordance with this invention can be the same fillers and/or reinforcing agents which have been used heretofore in the manufacture of molded articles or coatings from thermosetting compositions containing organopolysiloxanes, fillers and/or reinforcing agents as well as condensation catalysts, if desired. Fibrous fillers such as glass, asbestos as well as naturally occurring pure white fibrous magnesium silicate are preferred since these fillers substantially increase the hardness of the molded articles or coatings. The length of these fibers is generally from about 0.1 to about 10 mm. Additional examples of fillers (2) are pyrogenically produced silicon dioxide, silicic acid hydrogel which has been dehydrated while maintaining its structure and other precipitated silicon dioxide, diatomaceous earth, quartz meal, ground quartz glass, ground mica and mica having sheet-forming properties, asbestos powder, glass powder, ground porcelain fragments, calcium silicate, zirconium silicate, titanium dioxide and aluminum dioxide.

Examples of other fillers which have reinforcing properties are yarns, rovings and fabrics or fleeces consisting of glass or asbestos fibers. Mixtures of various fillers and/or reinforcing agents may be employed. The fillers (2) and/or reinforcing agents may be employed in the same quantities as those employed heretofore in the production of molded articles or coatings from thermosetting compositions containing organopolysiloxanes, fillers and/or reinforcing agents and condensation catalysts, if desired. Generally the amount of fillers and/or reinforcing agents may range from about 30 to 500 percent by weight and more preferably from about 50 to 300 percent by weight based on the weight of the organopolysiloxanes (1).

The condensation catalysts (3), which may also be employed in the compositions of this invention, may be the same as those which have been employed heretofore in the production of molded articles or coatings from thermosetting organopolysiloxane compositions. Examples of suitable condensation catalysts are lead compounds such as lead carbonate, basic lead carbonate, i.e., a compound corresponding to the formula $Pb_3(OH)_2(CO_3)_2$, lead monoxide, lead dioxide and lead naphthenate, as well as carboxylic acid salts of calcium, aluminum, iron, zinc, tin, cobalt and/or cerium, such as zinc naphthenate, zinc-2-ethylhexoate, tin octoate, dibutyltin diacetate, cobalt octoate, ferric naphthenate, calcium stearate, cobalt naphthenate, aluminum naphthenate, cerium octoate and cerium naphthenate; quaternary ammonium compounds such as tetramethylammoniumacetate; and metal alcoholates such as aluminum isopropylate and polymeric butyltitanate. Mixtures of various condensation catalysts may also be employed. When condensation catalysts are used, they may be employed in the same amounts as those used heretofore in the manufacture of molded articles or coatings from thermosetting compositions containing organopolysiloxanes, fillers and/or reinforcing agents and condensation catalysts.

Generally, the amount of condensation catalyst will range from about 0.5 to 5 percent by weight based on the weight of the organopolysiloxanes (1).

Diorganopolysiloxanes (4) which are preferably employed in the compositons of this invention are those containing an Si-bonded hydroxyl group or triorganosiloxy group in the terminal units, provided that the amount of Si-bonded hydroxyl groups in the diorganopolysiloxanes does not exceed about 5 percent by weight based on the weight of the diorganopolysiloxanes (4). Also, the diorganopolysiloxanes (4) must not be compatible with the organopolysiloxanes (1), i.e., when the diorganopolysiloxanes (4) and organopolysiloxanes (1) are mixed, they must form two phases.

The diorganopolysiloxanes (4) are preferably represented by the general formula

in which R is the same as above and $a$ is 0 or 1 and $n$ is a number in which the viscosity of these diorganopolysiloxanes is at least 30 cSt at 25° C.

In addition to the diorganosiloxane units ($R_2SiO$) the diorganopolysiloxanes (4) may also contain up to 20 mol percent but preferably no more than about 5 mol percent of other siloxane units, including terminal triorganosiloxy groups. Examples of siloxane units, other than the triorganosiloxy groups ($R_3SiO_{1/2}$), which are arranged along the chain are those corresponding to the formula $RSiO_{3/2}$ and $SiO_{4/2}$, where R is the same as above. Although it is not preferred, the hydroxyl groups may be substituted either entirely or partially with other condensable groups such as SiOC-bonded alkyl radicals having from 1 to 8 carbon atoms.

The substituted and unsubstituted hydrocarbon radicals represented by R above are the same as those described for the organopolysiloxanes (1) above. Also, up to 5 percent of the number of SiC-bonded organic radicals, i.e., the R radicals in the formulas which were previously mentioned in connection with the diorganopolysiloxanes (4), can be substituted with hydrogen, although it is preferred that the diorganopolysiloxanes (4) be free of Si-bonded hydrogen atoms. Because of their availability, at least 85 percent of the SiC-bonded organic radicals in the diorganopolysiloxanes (4) are methyl or phenyl radicals and at least 50 percent of the number of said radicals are methyl radicals.

Although there is no upper limit as to the viscosity of the diorganopolysiloxanes (4), it is preferred that the viscosity be no more than about 100,000 cSt at 25° C. However, the viscosity may be considerably higher such as, for example, $10^7$ cSt at 25° C. or above.

In order to insure that the mixture of organopolysiloxanes (1) and (4) forms two phases, the organopolysiloxanes (4) must be incompatible with the organopolysiloxanes (1). For example, they must form a heterogenous mixture, i.e., they are substantially incapable of being mixed. This is especially true when the organopolysiloxanes (1) are those having 0.3 to 1.2 phenyl radicals per Si-atom and when the diorganopolysiloxanes (4) are those in which 100 percent of the number of the SiC-bonded organic radicals are methyl radicals having a viscosity of at least 75 cSt at 25° C. When organopolysiloxanes (1) other than those having from 0.3 to 1.2 phenyl radicals per Si-atom and/or diorganopolysiloxanes (4) other than those previously mentioned are used, it can be determined by a simple preliminary test whether a two-phase mixture will be obtained by mixing the organopolysiloxane (1) with the diorganopolysiloxane (4) in an amount of from 15 to 30 percent by weight based on the weight of the organopolysiloxane (1). The diorganopolysiloxane having a viscosity of at least 30 cSt at 25° C. is soft even without a filler.

The compositions of this invention which contain organopolysiloxanes (1), fillers (2) and/or reinforcing agents, organopolysiloxanes (4) and condensation catalysts (3), if desired, may also contain substances which have previously been employed in the manufacture of thermosetting molded articles or coatings. Examples of such substances are particularly those which impart to the molded articles or coatings a desired color such as pigments and stabilization agents such as resorcin. Release or lubricating agents such as calcium or aluminum stearates may be included in these compositions, especially when the compositions are used in manufacturing molded articles or coatings under heat and pressure. Other compounds which may be included in the compositions of this invention are those that improve the flowability of the compositions during the molding process such as carboxylic acids, e.g., acetic, stearic or benzoic acid and/or their ammonium salts such as ammonium stearate, as well as ketones having a boiling point of at least 140° C. at 760 mm Hg (abs.) and a melting point which is below the temperature employed for molding the compounds. Examples of such ketones are phenylacetone and/or metal enolates of ketones such as aluminumacetylacetonate.

The compositions of this invention can be prepared by mixing the various components in accordance with any technique known in the art for preparing compositions which can be molded into articles or coatings. Thus, any sequence which is customary in the manufacture of molded articles or coatings from thermosetting compositions based on organopolysiloxanes, fillers and/or reinforcing agents and possibly condensation catalysts may be employed in this invention.

The compositions of this invention may be molded by any technique which is suitable for the production of molded or coatings from thermosetting compositions based on organopolysiloxanes, fillers and/or reinforcing agents as well as condensation catalysts, if desired. For example, they may be molded by means of extrusion molding, injection molding or stamping processes such as, for example, simply stamping or pressing into plates or rods, as well as by means of processes which do not employ pressure such as pouring or coating.

The molded compositions can be cured at the temperatures, time and pressures which have been employed heretofore in curing thermosetting compositions containing organopolysiloxanes, fillers and/or reinforcing agents as well as condensation catalysts, if desired. The temperature, time and pressure generally ranges from about 120° to 250° C. and from 30 seconds to 10 hours at a pressure of from 0 to 1,500 kg/cm$^2$ (abs.).

Nevertheless, better results are achieved when the compositions of this invention are molded under elevated temperatures and pressures. Pressures of from 50 to 200 kg/cm$^2$ (abs.) and temperatures of 150° to 200° C. are preferred.

The molded articles and coatings thus prepared from the compostions of this invention may, for example, consist of laminates, electric and insulating elements which contain mica as a filler (2) or electrical or electronic components which are covered by the cured compositions.

Various embodiments of this invention are further illustrated in the following examples in which all parts are by weight unless otherwise specified.

EXAMPLE 1

(a) In a laboratory kneader, 250 parts of an organopolysiloxane (1) which was obtained from the hydrolysis of phenyltrichlorosilane, methyltrichlorosilane, diphenyldichlorosilane and dimethyldichlorosilane in a mol ratio of 3:3:1:1 and containing at least 0.25 percent by weight based on its own weight of Si-bonded hydroxyl groups are mixed with 50 parts of a dimethylpolysiloxane (2) endblocked wth trimethylsiloxy groups and which has a viscosity of 200 cSt at 25° C., 210 parts of 0.2 mm long glass fibers, 600 parts of quartz meal, 5 parts of calcium stearate, 2 parts lead carbonate and 1 part of ammonium stearate.

After all components have been properly dispersed, the composition is molded into test rods at a pressure of 151 kg/cm$^2$ (abs.) and heated at this pressure to 175° C. for 3 minutes.

(b) The process described in Example 1(a) above is repeated except that 300 parts of organopolysiloxane (1) are used and the diorganopolysiloxane (2) is omitted. The following results are obtained.

| Examples | Linear shrinkage within 2 hours at 200° C. in % | Expansion coefficient mm/° C |
| --- | --- | --- |
| a | 0.08 | 1.15 |
| b | 0.38 | 2.85 |

EXAMPLE 2

A composition consisting of 635 parts of phenyltrichlorosilane, 150 parts of methyltrichlorosilane, 195 parts of dimethylchlorosilane, 190 parts of diphenyldichlorosilane and 110 parts of a dimethylpolysiloxane which has in each of its terminal units an Si-bonded hydroxyl group and which has a viscosity of 200 cSt at 25° C. is poured into a mixture containing 4000 parts of water and 1732 parts of toluene under constant stirring. The organopolysiloxane mixture thus obtained is washed with water to remove the hydrochloric acid and then heated at 12 mm Hg (abs.) in order to remove the solvent. The thus treated organopolysiloxane mixture is tough and milky-white due to the formation of two phases. The organopolysiloxane portion of the mixture which is obtained from the above described hydrolysis contains at least 3 percent by weight based on its own weight of Si-bonded hydroxyl groups.

300 parts of the organopolysiloxane composition prepared above are mixed with 210 parts of 0.2 mm long glass fibers, 600 parts of quartz meal, 5 parts of calcium stearate, 2 parts lead carbonate and 1 part ammonium stearate. A portion of the thus obtained mass is molded into test rods under a pressure of 151 kg/cm² (abs.) and heated at this pressure to 175° C. for 3 minutes. The following results are obtained.

Linear shrinkage: 0.03%
Bending resistance: 725 kp/cm² or kg/cm²

The test specimen is then subjected to a spiral flow test in which it is injected under a pressure of 100 kg/cm² into a flow test mold that has been heated to 175° C. The flow test mold has a channel cavity with a half-round cross section and a radius of 1.6 mm. The channel is in the shape of a Newton spiral.

The wall of the channel is etched with markings at a distance of 2.54 cm (equal to 1 flow unit). After the mass has hardened it is removed from the mold. The number of flow units on said spiral is used to measure the flowability of the mass during the molding process. The result of the spiral flow test is 25 flow units.

EXAMPLE 3

Into a laboratory kneader are added about 100 parts of the organopolysiloxane (1) which has been obtained from the hydrolysis of phenyltrichlorosilane, methyltrichlorosilane, diphenyldichlorosilane and dimethyldichlorosilane at a mol ratio of 3:3:1:1 which contains at least 0.25 percent by weight based on the weight of the organopolysiloxane (1) of Si-bonded hydroxyl groups and then mixed with various amounts of a diorganopolysiloxane having a viscosity of 80,000 cSt at 25° C. which has an Si-linked hydroxyl group in each of its terminal units and contains 97 mol percent of dimethylsiloxane and 3 mol percent of diphenylsiloxane units, 300 parts of ground quartz glass, 0.5 part of lead carbonate and 0.5 part of ammonium stearate.

The thus obtained compositions are used in the preparation of test rods under a pressure of 151 kg/cm² (abs.) and heated at this pressure to 175° C. for 3 minutes.

| Test rods prepared from compositions containing diorganopolysiloxane, weight percent based on the weight of organopolysiloxane (1) | Linear Shrinkage % |
|---|---|
| 15 | 0.19 |
| 20 | 0.14 |
| (Comparison Example) 0 | 0.43 |
| (Comparison Example) 5 | 0.40 |

Although specific examples of the invention have been described herein, it is not intended to limit the invention solely thereto, but to include all the variations and modifications falling within the spirit and scope of the appended claims.

What is claimed is:

1. A thermosetting composition for molding articles and coatings which consists essentially of (1) an organopolysiloxane containing at least 40 mol percent of monoorganosiloxane units and having at least 0.1 percent by weight of condensable groups, (2) a filler, (3) a condensation catalyst and (4) a diorganopolysiloxane which is incompatible with organopolysiloxane (1) and has a viscosity of at least 30 cSt at 25° C in which the diorganopolysiloxane (4) is present in an amount of from 15 to 30 percent by weight based on the weight of the organosiloxane (1) and the resulting mixture consisting of the organopolysiloxane (1) and (4) forms two phases.

2. The composition of claim 1 in which the organopolysiloxane (1) contains an average of 0.3 to 1.2 phenyl radicals per silicon atom and have on the average a total of 0.9 to 1.7 SiC-bonded organic radicals per silicon atom and at least 0.1 percent by weight of Si-bonded hydroxyl groups and up to 3 percent by weight of Si-OC-bonded alkyl radicals.

3. The composition of claim 1 in which the organopolysiloxane (1) contains at least 40 mol percent of hydrolyzable monoorganosilanes which have been obtained from the hydrolysis of hydrolyzable monorganosilanes.

4. The composition of claim 1 in which the diorgano polysiloxane (4) contains an Si-bonded hydroxyl group in at least one of the terminal units and the amount of Si-bonded hydroxyl groups in said diorganopolysiloxane is no more than 5 percent by weight based on the weight of the diorganopolysiloxane (4).

5. A method for preparing a molded article which comprises preparing a composition consisting essentially of (1) an organopolysiloxane containing at least 40 mol percent of monoorganosiloxane units and having at least 0.1 percent by weight of condensable groups, (2) a filler, (3) a condensation catalyst and (4) a diorganopolysiloxane which is incompatible with organopolysiloxane (1) and has a viscosity of at least 30 cSt at 25° C in which the diorganopolysiloxane (4) is present in an amount of from 15 to 30 percent by weight based on the weight of the organosiloxane (1) and the resultant mixture consisting essentially of organopolysiloxanes (1) and (4) forms two phases and thereafter introducing the composition into a mold having the desired configuration and thereafter curing the molded article.

6. The method of claim 5 wherein the composition is introduced into an extrusion molding device.

7. The method of claim 6 wherein composition is extruded at a temperature of from 120° to 250° C. and at a pressure of from 0 to 1500 kg/cm² (abs.).

8. The molded and cured article obtained from the method of claim 5.

9. The composition of claim 1 in which the organopolysiloxane (1) has been obtained from the hydrolysis of hydrolyzable monoorganosilanes or mixtures of hydrolyzable silanes consisting of at least 40 mol percent of hydrolyzable monoorganosilanes in the presence of diorganopolysiloxanes (4) having a viscosity of at least 200 cSt at 25° C.

* * * * *

UNITED STATES PATENT AND TRADEMARK OFFICE
CERTIFICATE OF CORRECTION

PATENT NO. : 4,102,970
DATED : July 25, 1978
INVENTOR(S) : Bernward Deubzer and Werner Graf It is certified that error appears in the above-identified patent and that said Letters Patent are hereby corrected as shown below:

Page 1, column 1, after "[22] Filed: March 23, 1977", insert
--- [30] Foreign Application Priority Data
October 3, 1974 Germany.........2447265 ---

Signed and Sealed this

First Day of May 1979

[SEAL]

Attest:

RUTH C. MASON
Attesting Officer

DONALD W. BANNER
Commissioner of Patents and Trademarks